(12) United States Patent
Gresset et al.

(10) Patent No.: US 10,881,049 B2
(45) Date of Patent: Jan. 5, 2021

(54) GUIDING DEVICE AND BALER

(71) Applicant: DEERE & COMPANY, Moline, IL (US)

(72) Inventors: Pascal Gresset, Auxon Dessous (FR); Romain Repecaud, Arc les Gray (FR); Matthieu Dutertre, Chemaudin (FR)

(73) Assignee: DEERE & COMPANY, Moline, IL (US)

( * ) Notice: Subject to any disclaimer, the term of this patent is extended or adjusted under 35 U.S.C. 154(b) by 113 days.

(21) Appl. No.: 16/170,641

(22) Filed: Oct. 25, 2018

(65) Prior Publication Data

US 2019/0133043 A1     May 9, 2019

(30) Foreign Application Priority Data

Nov. 8, 2017    (DE) ........................ 10 2017 219 868

(51) Int. Cl.
*A01F 15/07*        (2006.01)

(52) U.S. Cl.
CPC .... *A01F 15/0715* (2013.01); *A01F 2015/078* (2013.01)

(58) Field of Classification Search
CPC ............... A01F 15/071; A01F 15/0715; A01F 2015/078; B65B 41/12
USPC ............. 53/116, 118, 528, 587, 389.3, 389.5
See application file for complete search history.

(56) References Cited

U.S. PATENT DOCUMENTS

| | | | |
|---|---|---|---|
| 4,676,046 A * | 6/1987 | Verhulst et al. | .... A01F 15/0715 53/118 |
| 4,677,807 A * | 7/1987 | Verhulst et al. | .... A01F 15/0715 53/118 |
| 4,697,402 A * | 10/1987 | Anstey et al. | ...... A01F 15/0715 53/506 |
| 4,969,315 A | 11/1990 | Ardueser et al. | |
| 5,450,704 A * | 9/1995 | Clostermeyer | ......... A01F 15/07 100/5 |
| 5,557,906 A | 9/1996 | Viaud | |
| 5,729,953 A * | 3/1998 | Fell et al. | ........... A01F 15/0715 53/118 |
| 8,516,779 B2 * | 8/2013 | Bennett et al. | ..... A01F 15/0715 53/116 |

(Continued)

FOREIGN PATENT DOCUMENTS

| | | |
|---|---|---|
| DE | 4426034 A1 | 1/1996 |
| EP | 0253252 A1 | 1/1988 |

OTHER PUBLICATIONS

European Search Report issued in counterpart application No. 18204623.5 dated Apr. 8, 2019. (7 pages).

(Continued)

*Primary Examiner* — Stephen F. Gerrity

(57) ABSTRACT

An agricultural baler includes a frame, a pressing belt operable to form a pressed bale in a pressing chamber, and a wrapping device operable to supply a wrapping material. A guide is disposed adjacent to and extends along the pressing belt. The guide leads the wrapping material to the pressing chamber. The guide includes a front mount and a rear mount. The front mount and the rear mount attach the guide to the frame, and each includes a spring biasing the guide toward the pressing belt. The front mount and the rear mount are spaced apart from each other along a longitudinal axis of the frame.

14 Claims, 8 Drawing Sheets

(56) References Cited

U.S. PATENT DOCUMENTS

2002/0189197 A1* 12/2002 Anstey et al. ...... A01F 15/0715
53/118
2015/0047311 A1* 2/2015 Jacobson et al. ... A01F 15/0715
53/118

OTHER PUBLICATIONS

German Search Report issued in counterpart application No. 102017219868.0 dated Jun. 27, 2018. (10 pages).

* cited by examiner

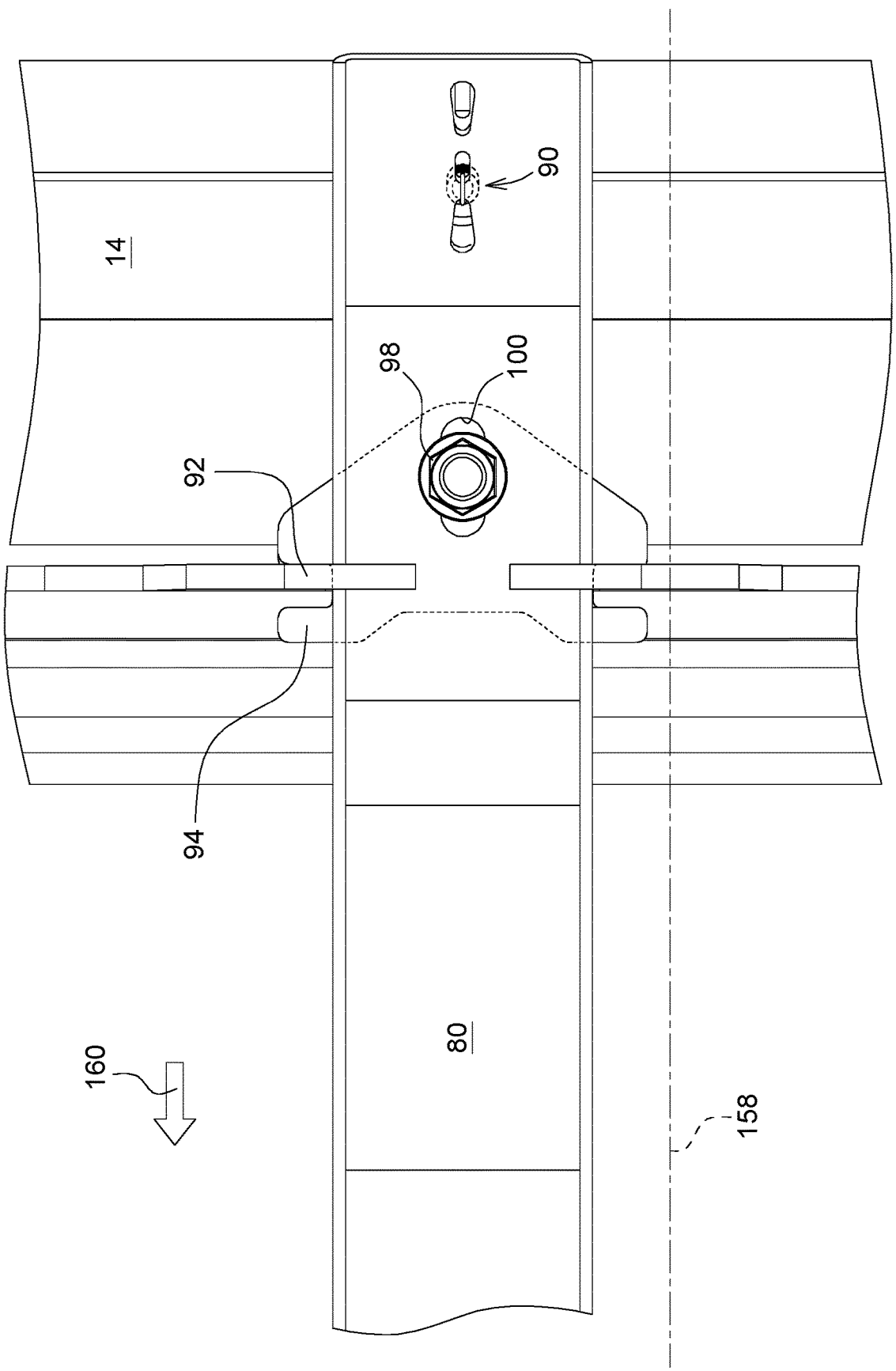

GUIDING DEVICE AND BALER

RELATED APPLICATIONS

This application claims priority to German Patent Application Ser. No. 102017219868.0, filed Nov. 8, 2017, the disclosure of which is hereby incorporated by reference in its entirety.

FIELD OF THE DISCLOSURE

The present disclosure relates to a guiding device for an agricultural baler, and in particular to a baler having a pressing means and a guiding means extending at least in certain regions along the pressing means for leading a wrapping material up to the pressing means, wherein the guiding means can be adjustably connected to a frame of the baler.

BACKGROUND

Known guiding devices are provided in order to hold a wrapping material in contact with a pressing means of a baler or to lead the wrapping material up to a pressing means or a pressed bale. These balers are used both in the agricultural and in the industrial sector. Corresponding agricultural balers serve, for example, to form crop bales in the form of round bales or at least substantially round-cylindrical bales of crop. The crop may be of the straw type, hay type, chopped material type, etc. Industrial presses are used in the compaction of refuse, textiles or other materials, or in the pressing thereof to form bales.

These conventional guiding devices usually have a guiding means which is frequently formed as a sheet-metal part or in the manner of a grate. In many cases, the guiding means is mounted pivotally at one end and adjustably in a further region in such a way that a spacing between the guiding means and the pressing means can be changed depending on the respective use conditions. Thus, in the case of wet crop, for example, a greater spacing can be provided in order to avoid blocking of the feed of the wrapping material by adhering crop. It is usually the case that the guiding means is articulatedly connected at one end to a frame of the baler and can be pivoted about the articulation. In particular, with changing use conditions, it is possible in such guiding devices for there to occur poor or incomplete conveying or blocking of the wrapping material.

SUMMARY

In a first embodiment of the present disclosure, a guiding device for an agricultural baler which has at least one pressing means and is intended for forming round-cylindrical pressed bales has at least one guiding means extending at least in certain regions along the pressing means for leading a wrapping material up to the pressing means, wherein the guiding means can be adjustably connected to a frame of the baler in such a way that either a spacing between the guiding means and the pressing means or a pressing or pre-stressing force, which applies the guiding means to the pressing means or which acts on the guiding means, can be changed or adjusted. If the guiding means can be received on the frame via at least two resiliently pre-stressed bearing means, the guiding means can be automatically adapted to environmental influences. In particular, the guiding means can deflect in a flexible manner such as over its entire extent or in certain regions, if material, in particular crop or crop residues or impurities, accumulate in the region between the guiding means and the pressing means or if such material accumulates on the pressing means.

If the bearing means are spaced apart at least with respect to a longitudinal axis of the baler or a conveying direction of the wrapping material, this promotes the movement possibilities of the guiding means. For example, a disturbance can first occur in a rear region of the guiding means or of the baler if an adherence or material is introduced here by the pressing means or the wrapping material in to the active region of the guiding means. The guiding means can then at first move aside from the disturbance in this rear region, in particular in that the corresponding bearing means allows the guiding means to move aside, and can move aside or deflect in a region, or a central region, situated further forward, for example, with respect to the conveying direction or the baler if the disturbance reaches this region or acts on it, in particular in that the corresponding bearing means then also alternatively or additionally allows the guiding means to move aside in the corresponding region. The described movement sequence should be understood only by way of example.

It is particularly advantageous if at least one bearing means has at least one spring means which prestresses or loads the guiding means in the direction of the pressing means. The spring means is designed in the manner of a compression spring or a tension spring or comprises such a spring. There can be provision that the two bearing means are designed as a compression spring or a tension spring or comprise such a spring; however, it is particularly advantageous if the guiding means is loaded at one end by a compression spring and at the other end by a tension spring.

There can be provided only one guiding means which extends over the entire feed width of the wrapping material or else only over a partial region of the feed width. However, it is particularly advantageous if a plurality of guiding means are provided which are in particular mounted independently of one another or in each case have two bearing means. In this way, it is possible, for example, for only one or not all guiding means to move aside from a material accumulation or to deflect as a result of such an accumulation, with the remaining guiding devices continuing to be able to hold the wrapping material in contact with the pressing means. Moreover, a replacement or mounting/demounting of an individual guiding means is thus possible.

The one or more guiding means extends at least substantially parallel to a longitudinal axis of the baler or in a usual conveying direction of the wrapping material. In this way, the guiding means can bring the wrapping material up to the pressing means over as large a region as possible or can support a grasping or a conveying of the wrapping material by the pressing means in a particularly effective manner or over a particularly large region.

It is particularly advantageous if at least one guide element is provided for guiding the one or more guiding means, in particular, in a vertical direction or perpendicularly to the pressing means. Such a guide can be part of one of the or both bearing means or support them in their function.

It is conceivable that the one or more guiding means is arranged at any desired point in or on the pressing chamber. The guiding means is arranged, in operation, at least substantially under the pressed bale.

If the one or more guiding means leads the wrapping material up to a side of the pressing means that faces away from the pressed bale, this can promote a grasping or conveying of the wrapping material by the pressing means. If the wrapping material of the baler is led up to the pressed bale in a region, which faces a receiving device, of the pressing chamber between the pressing means and an in particular stationary roller, this likewise promotes the feeding or conveying of the wrapping material by the pressing means.

The pressing means can be designed as a pressing roller or in any other manner. However, it is particularly advantageous if the pressing means is designed as an endless pressing means in the form of one or more belts which evolve at least approximately parallel to a longitudinal direction of the baler or comprises one belt.

If a baler is equipped with at least one guiding device, this can support the function of the baler and a wrapping operation during which a pressed bale is wrapped with a wrapping material in a pressing chamber of the baler upon conclusion of a bale-forming operation. The guiding device can contribute to the wrapping material being led up uniformly or without disturbances to the pressed bale. For this purpose, the guiding device can interact with the pressing means in such a way that the guiding device holds the wrapping material in contact with the pressing means, with the result that the latter can grasp the wrapping material or support a conveying of the wrapping material in the direction of the pressed bale or of the pressing chamber. The baler can be an industrial press, for example, a press for forming pressed bales of materials, such as, paper, waste, textiles, etc. However, the baler is embodied as an agricultural baler for forming round-cylindrical pressed bales. This particularly applies if the pressing means is designed as an endless pressing means in the manner of a pressing belt, or comprises a belt. The baler may be an agricultural baler for forming round-cylindrical bales. A use on a press for forming cuboidal or other bales is also conceivable.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIGS. 3a-c are enlarged illustrations of a rear region of the guiding device with its rear bearing means when viewed from the rear, the front and below with respect to the baler.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
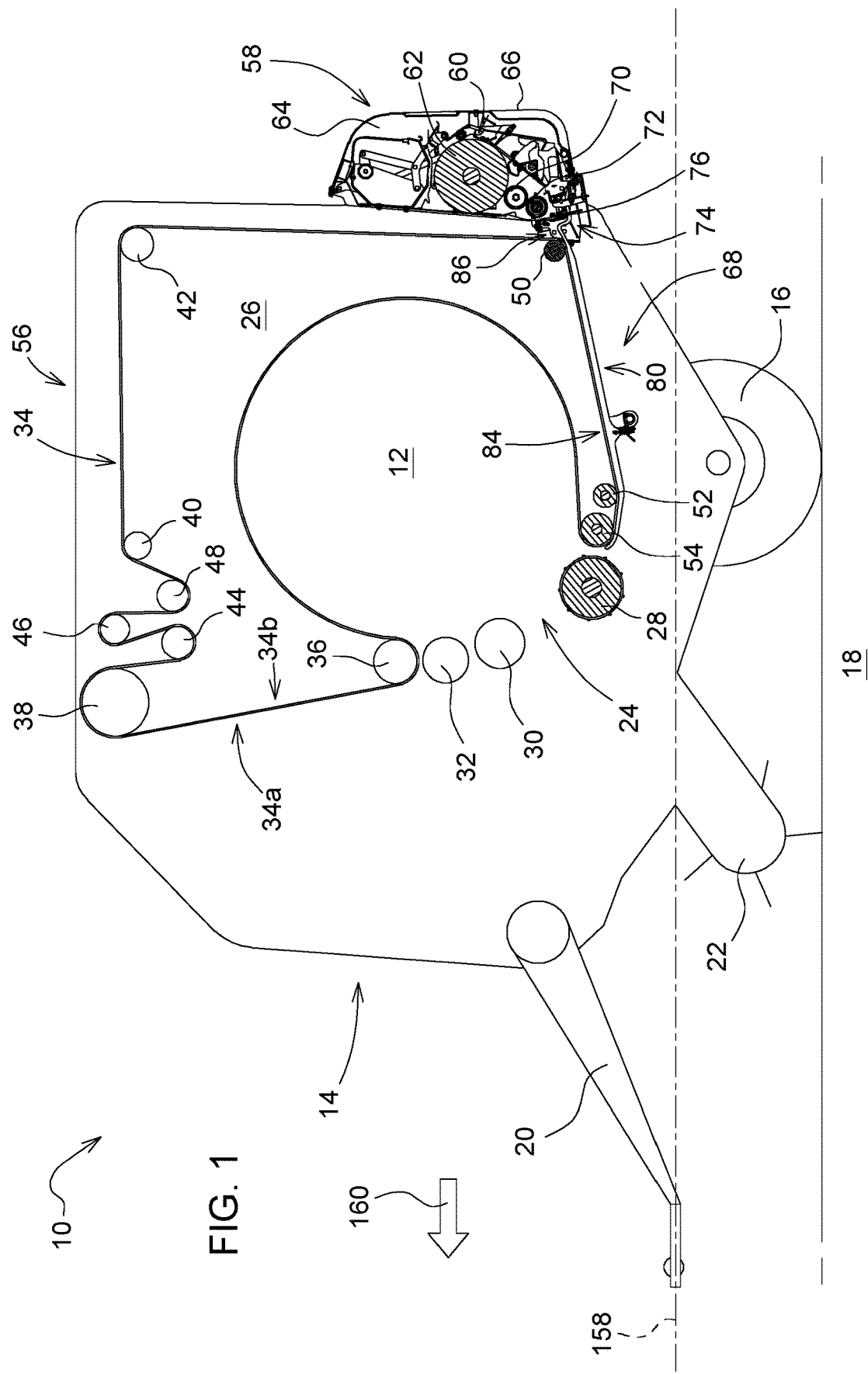
FIG. 1 is a side view of a baler having a guiding device arranged in a lower region thereof.

In FIG. 1, a schematically illustrated baler 10, in the form of an agricultural round baler for pressing a round-cylindrical bale 12, is shown including a frame 14 supported on an underlying surface 18 by means of wheels 16 and which can be connected by means of a drawbar 20 to a tractor vehicle (not shown). The frame 14 extends along a longitudinal axis 158 that is parallel to a forward direction of travel 160 of the baler 10.

On a lower side of the frame 14 that is at the front with respect to the forward direction of travel, there is situated, in a known manner, a receiving device 22 for receiving and feeding crop, which conveys chopped crop into a pressing chamber 26 via an inlet 24.

At the inlet 24 of the bale-pressing chamber 26 there are positioned a lower, stationary roller 28 and two upper rollers 30, 32. The bale-pressing chamber 26 is further formed by an endless pressing means 34, which, according to the present embodiment, is configured in the manner of pressing belts bearing next to one another, and is guided around a number of positionally fixed rollers 36, 38, 40, 42 and movable rollers 44, 46, 48, 50, 52, 54. The pressing means 34 has an outer side 34a, which faces the frame 14, and an inner side 34b.

The bale-pressing chamber 26 is peripherally surrounded substantially by the pressing means 34 and the rollers 28, 30 and 32, and it is delimited laterally by side walls (not shown).

Three rollers 50, 52, 54 of the movable rollers 44-54 are articulated pivotally in such a way that they can be brought by means of an actuator (not shown) from the bale-forming position illustrated in FIG. 1, into a rearwardly and upwardly pivoted bale-ejection position.

The pressing means 34 is firmly supplied to the rotationally driven, positionally fixed roller 38 by means of a tensioning means (not shown) so as to ensure that it is carried along. The roller 36 is also rotationally driven. The pressing means 34 assumes an initial state in which, while being stretched rectilinearly, it bridges the inlet 24, and an end state in which, as shown in FIG. 1, forms a large loop around a bale 12 to be pressed. The bale-pressing chamber 26 is thus variable in size, i.e., its diameter increases with the size of the bale 12 to be pressed. The bale to be pressed 12 is situated in the bale-pressing chamber 26 during its formation and is for its most part enwrapped by the pressing means 34, but falls out of the bale-pressing chamber 26 in the rearward direction onto the underlying surface 18 as soon as the rollers 50-54 pivot together with a rear housing part 56.

The rear housing part 56 may also be provided with a wrapping device 58 which is embodied in a manner known per se and which is suitable for wrapping the pressed bale 12 with a wrapping material 60. The wrapping material 60 is wound up on a supply roll 62 which is received in the interior 64 of a housing 66 and is mounted adjoining a lower region 68 of the baler 12 on the rear housing part 56.

The wrapping device 58 has two conveying rollers 70, 72 which, at least at the start of a wrapping operation, draw off the wrapping material 60 from the supply roll 62. Arranged downstream of the conveying rollers 70, 72 is a separating device 74 with a pivotally mounted cutter 76 which, upon completion of the wrapping operation, can be pivoted by means of an actuator (not shown) in order to sever the wrapping material 60 wrapping the pressing material from the supply roll 62.

Figure 2:
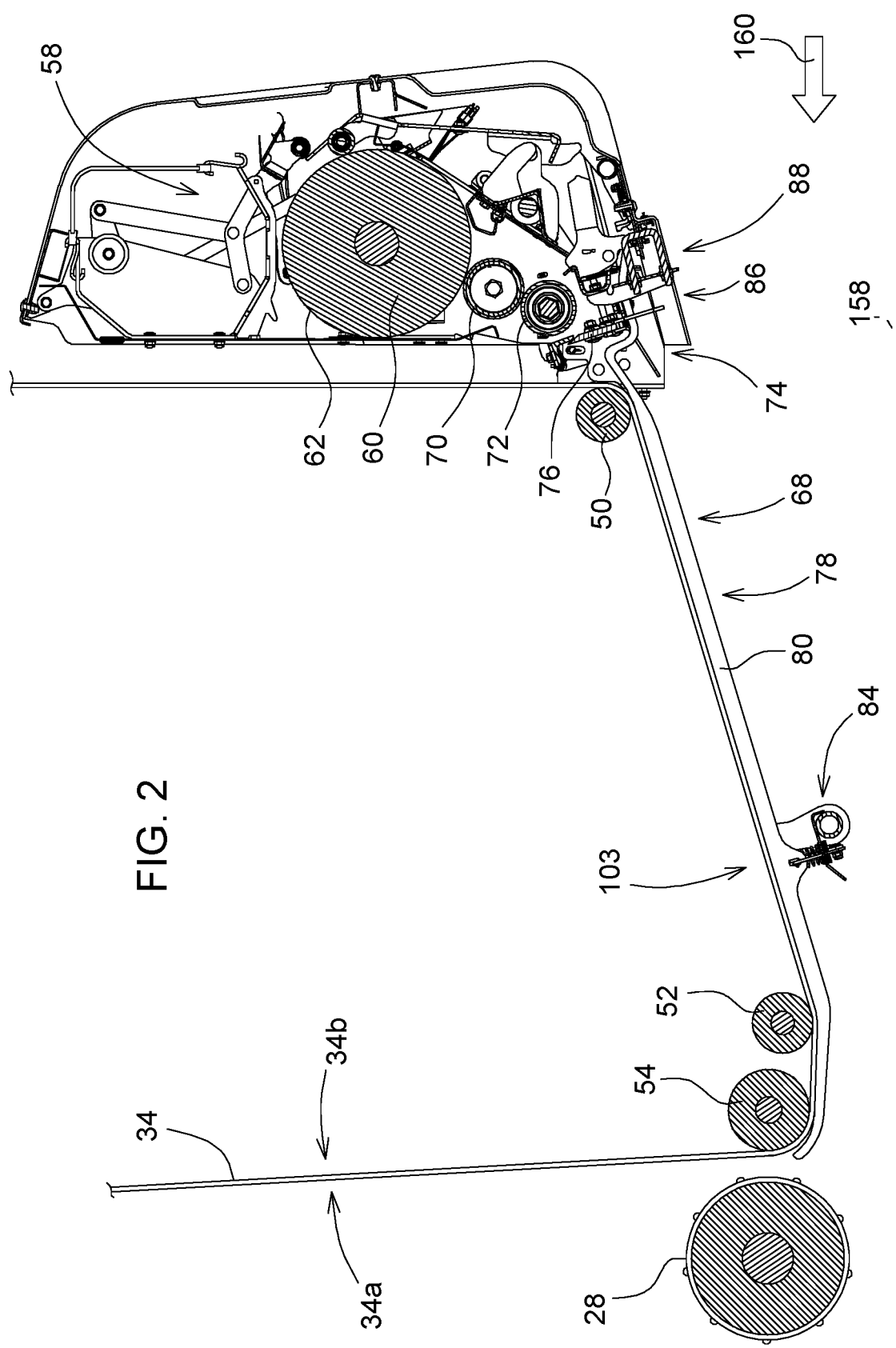
FIG. 2 is an enlarged schematic of the lower region.

A guiding device 78 (for better clarity, see the enlarged illustration in FIG. 2) is provided adjacent to the wrapping device 58 in the lower region 68 of the baler 10 below the pressing means 34 and contributes to leading the wrapping material 60 up to the pressed bale 12 in the pressing chamber 26 such that the wrapping material 60 can be grasped by the pressed bale 12 in order to wrap it. The guiding device 78 may alternatively be referred to as the guide 78.

With reference to FIGS. 3a-c and 4a-c, the guiding device 78 has a plurality of guiding means 80 which are arranged approximately parallel to the longitudinal axis 158 of the baler 10 and extend substantially in the direction of the longitudinal axis 158.

The guiding means 80 are mounted on the frame 14 of the baler 10 in each case via a front mount, hereinafter referred to as the front bearing means 84 and a rear mount, hereinafter referred to as the rear bearing means 86 with respect to the forward direction of travel 160 of the baler 10. The bearing means 84, 86 are designed in such a way that they resiliently load the guiding means 80 in the direction of the pressing means 34 and moreover provide a guiding of the bearing means 84, 86 substantially in the vertical direction or approximately perpendicularly to the pressing means 34.

Figure 3A:
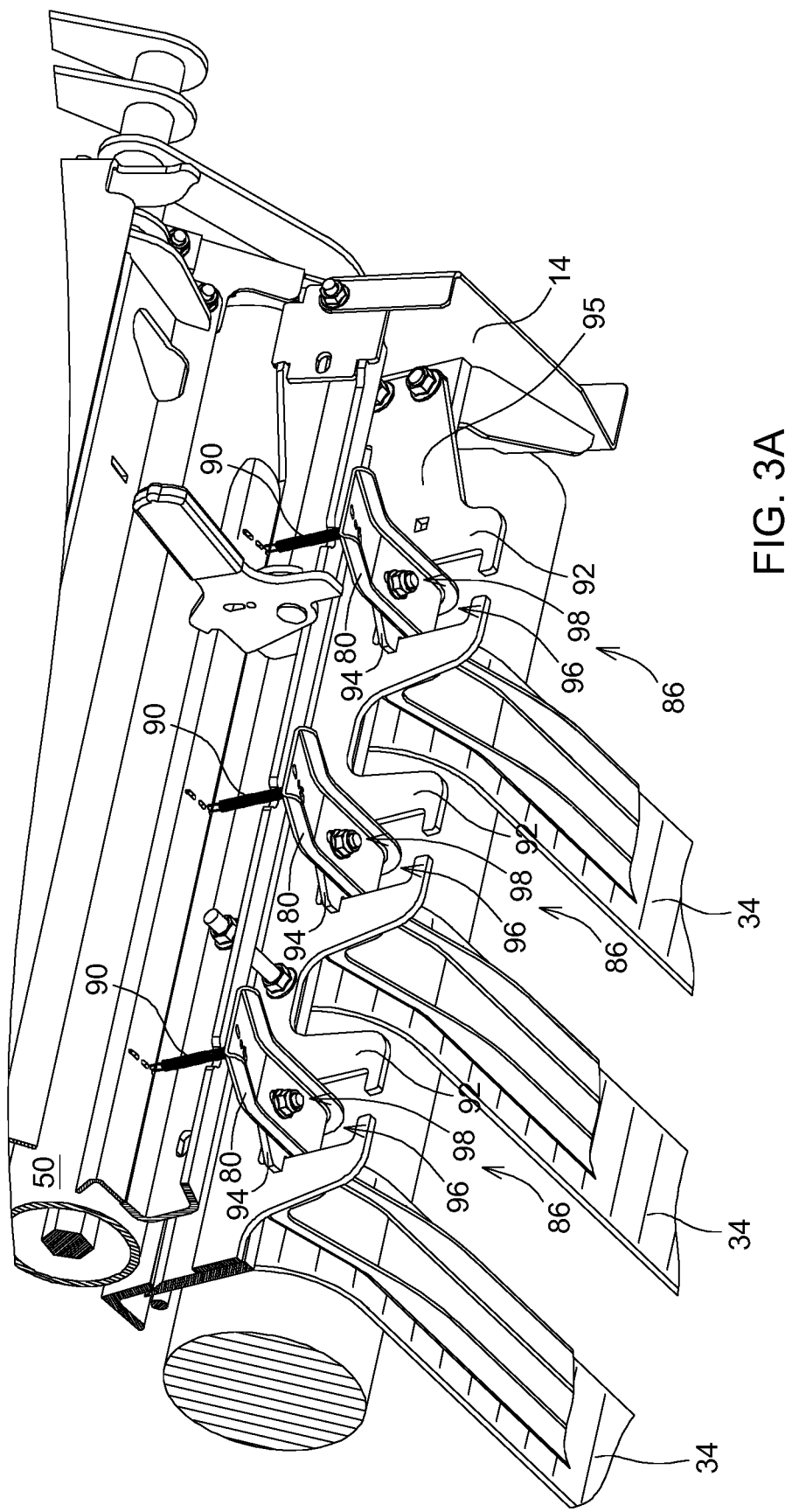
Figure 3B:
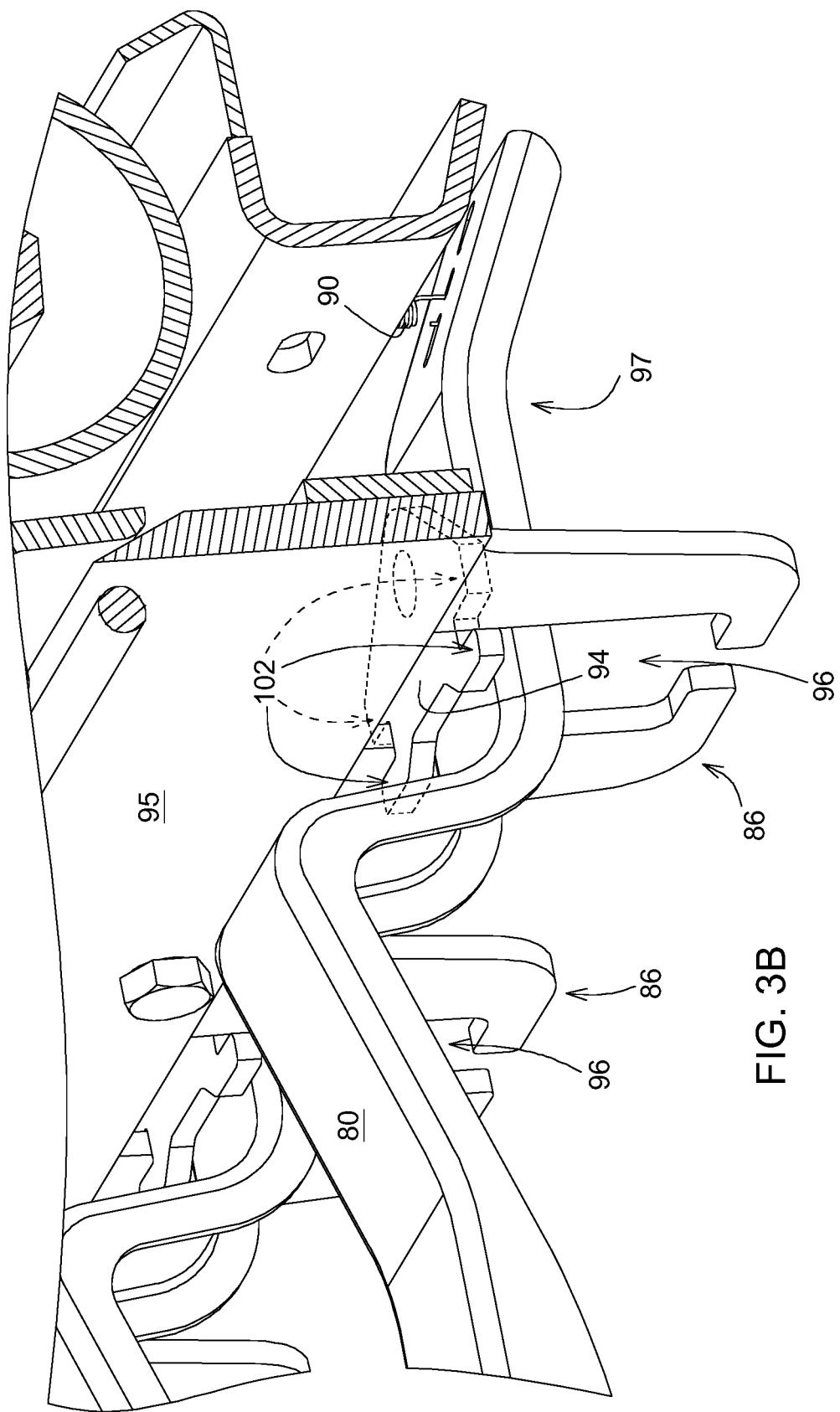

FIGS. 3a-c show a rear region 88 of the guiding means 78 in various perspectives in an enlarged illustration. The bearing means 86 each have a spring means 90, a guide element 92 and a guide means 94, wherein, according to the present embodiment, the guide elements 92 of a plurality of bearing means 86 are formed in one part or integrated in a guide carrier 95 which is connected, e.g., screwed, to the frame 14 of the baler 10. This simplifies the production, reduces the number of components and can improve the stability. It is conceivable, for example, that the guide elements 92 are integrated into a sheet-metal part or are formed by such a part.

The guide element 92 has a substantially vertically extending guide slot 96 which receives the guide means 80 in such a way that it can move in the upward or downward direction or generally up and down with respect to the baler 10 in the guide slot 96. The guide means 94 is provided on an end region 97 of the guiding means 80 that faces the wrapping device 58 and is mounted so as to be adjustable in the longitudinal direction of the guiding means 80 via a screw connection 98 in an oblong hole 100 in the guiding means 80. The guide means 94 has stop means 102 which interact with the guide element 92 in order to limit a movement of the guiding means 80 in the guiding means 80 in the longitudinal direction. For illustration, FIG. 3b shows the non-visible contour of the stop means 102 in interrupted lines.

Moreover, the end region 97 of the guiding means 80 is connected to the frame 14 of the baler by the spring means 90 in such a way that the spring means 90 loads or resiliently pre-stresses the guiding means 80 in the direction of the pressing means 34. According to the present embodiment, the spring means 90 is designed as a tension spring.

Figure 4A:
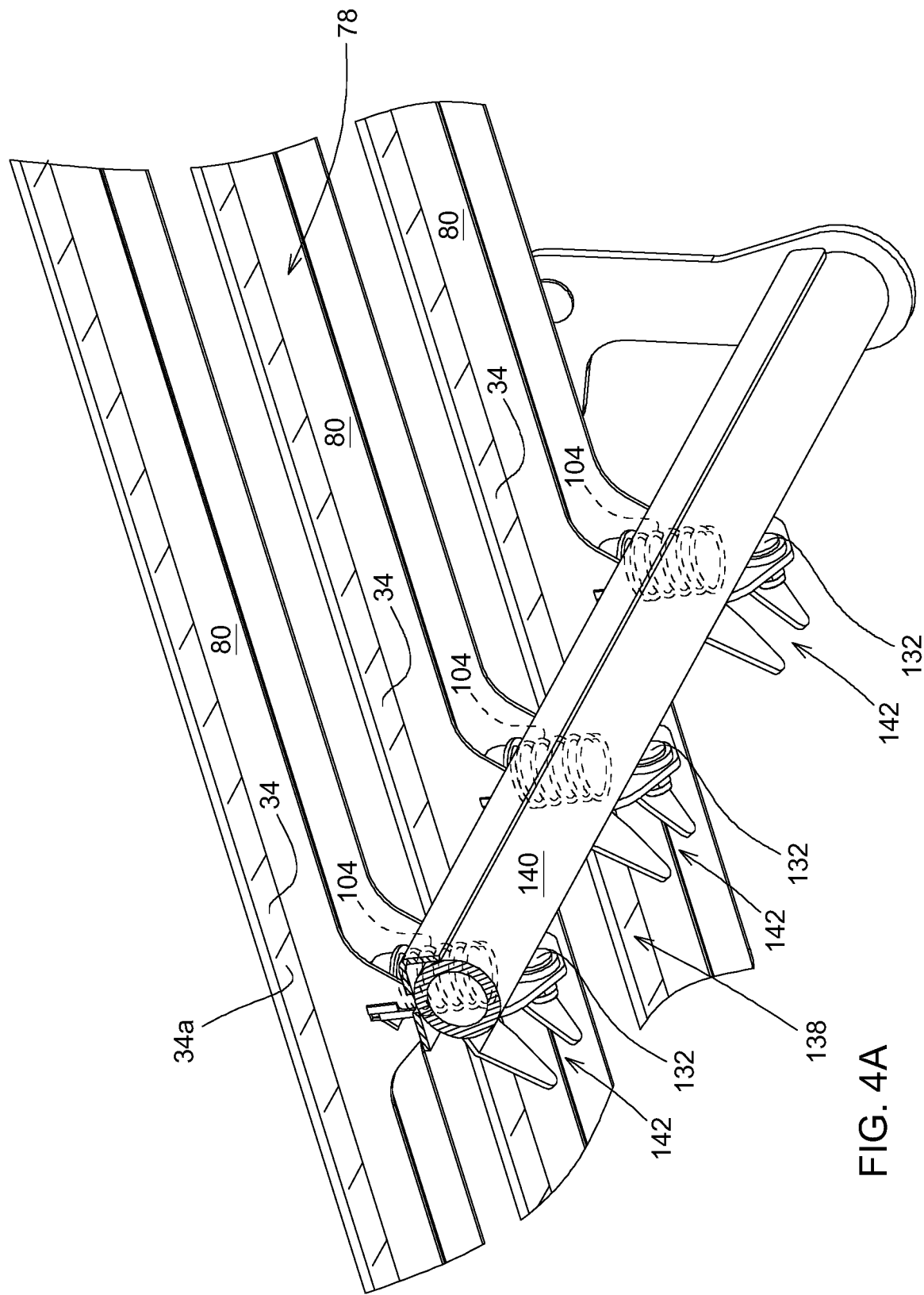
FIGS. 4a-c are enlarged illustrations of a central region of the guiding device with further bearing means when viewed from the rear with respect to the baler, when viewed in a further enlargement from the rear and from the front.
Figure 4B:
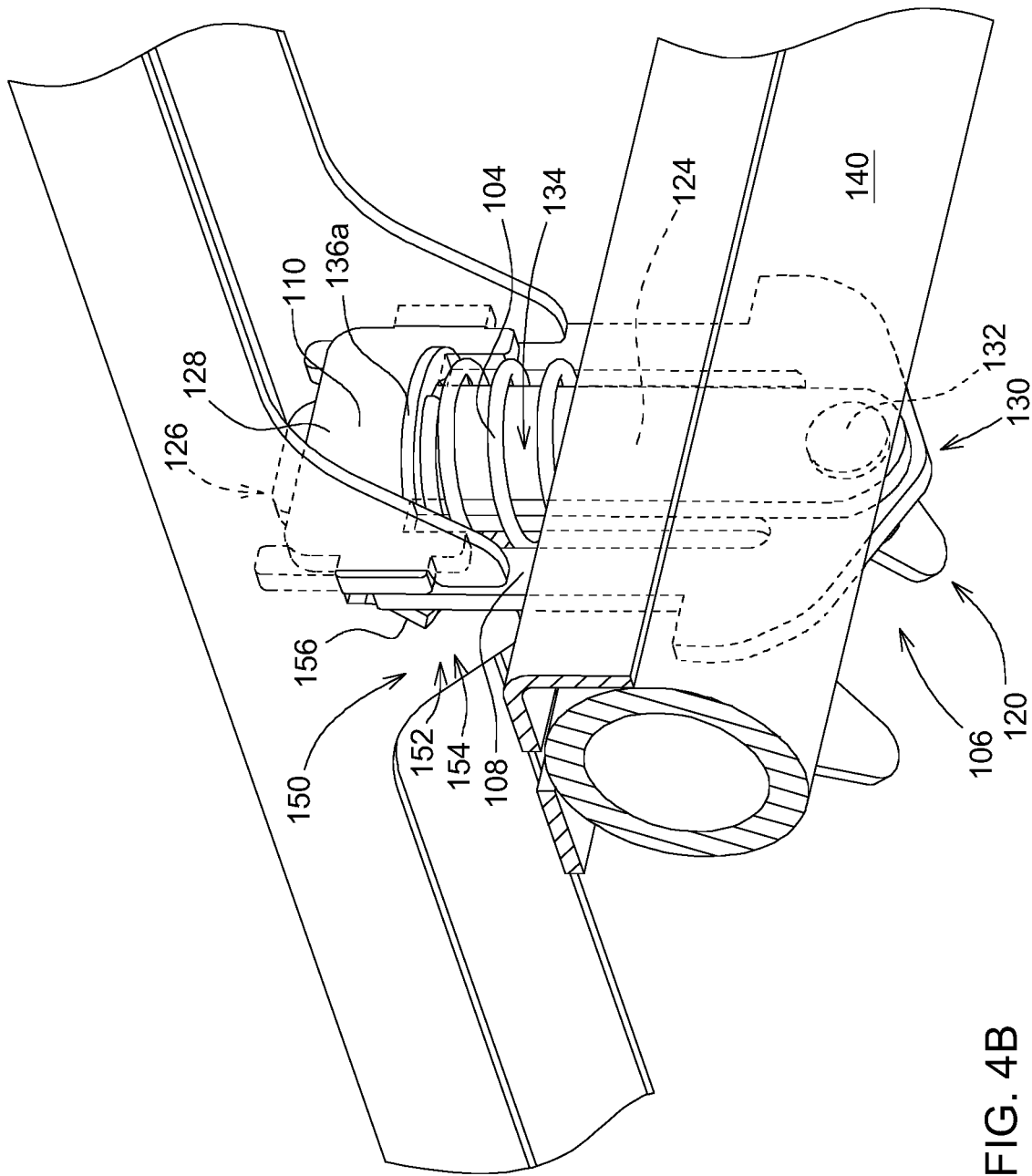
Figure 4C:
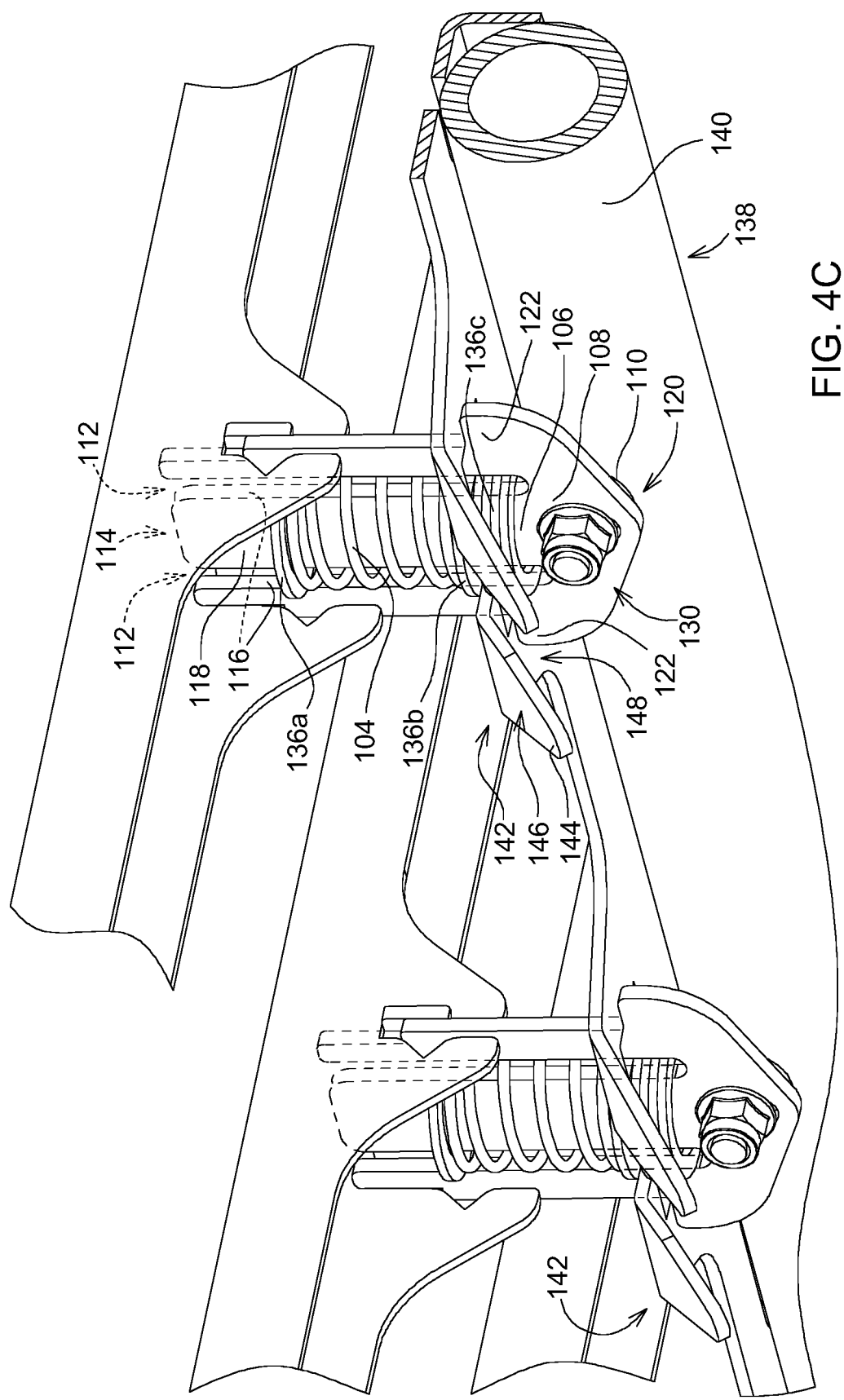

In FIGS. 4a-c, the bearing means 84 is arranged in a central region 103 of the guiding device 78, wherein the front bearing means 84 each have a spring means 104 and a guide element 106 in an analogous manner to the rear bearing means 86.

The guide element 106 of the second bearing means 84 is of two-part design and has a first rail means 108 and a second rail means 110, wherein both the first rail means 108 and the second rail means 110 are designed as substantially flat, elongate sheet-metal parts. Provided in the rail means 108 are guide means 112 which are designed in the manner of two longitudinal slots 116 which extend in the longitudinal direction of the rail means 108 and are opened in a first end region 114 of the rail means 108, between which slots there extends a central web 118. Stops 122 are provided adjacent to an end region 120 opposite to the first end region 114. For illustration, FIG. 4b illustrates the non-visible contour of the rail means 110 in interrupted lines and FIG. 4c illustrates the non-visible contour of the rail means 108 in interrupted lines.

The second rail means 110 has a narrow, elongate central part 124 whose width corresponds to the width of the central web 118, a first end region 126 in which a widened holding element 128 is provided, and a second end region 130 opposite to the first end region 126. The first and the second rail means 108, 110 are firmly connected in their second end regions 120, 130 via a screw connection 132, wherein the spring means 104 designed in the manner of a compression spring is received in the longitudinal slots 116, wherein the central web 118 and the second rail means 110 extend in the interior 134 of the spring means 104. Moreover, stop pieces 136 a, b, c designed as substantially circular discs are provided on both ends of the spring means 104.

In operation, the guide element 106 is received at one end by a carrier element 138 which is firmly connected to the frame of the baler 14. The carrier element 138 has a cross-member 140 on which there are provided a plurality of receiving means 142 for receiving a guide element 106. The receiving means 142 are designed as two-prong forks between the prongs 144 of which the guide elements 106 can be inserted. In the mounted state, the stops 122 are in contact with a lower side 146 of the prongs 144. The second stop piece 136b is provided between the spring means 106 and an upper side 148 of the prongs 144 and is held by the spring means 106 in contact with the prongs 144 or the upper side 148 thereof.

At the other end, the guide element 106 of the second bearing means 84 is received in a connection region 150 of the guiding means 80. For this purpose, the connection region 150 has a clearance 152 into which the guide element 106 or the first end regions 114,126 of the rail means 108, 110 can be introduced and secured. For this purpose, the clearance 152 has a slot 154 which is open at one end and which opens at the other end in an extension 156 for receiving the holding element 128.

In the following, the mode of operation of the above-descried guiding device 78 will now be discussed more precisely. Upon completion of the formation of a pressed bale 12 in the pressing chamber 26 of the baler 10, the wrapping device 58 is activated by means of a control device (not shown), with the result that this wrapping material 60 is led up to the pressed bale 12. For this purpose, the wrapping material 62 is transported or conveyed by the conveying roller 70 from the supply roll 62 and by means of the second conveying roller 72 substantially downwards past the separating device to the guiding device 78. The wrapping material 60 comes into contact with the outer side of the pressing means 34, with the result that it is conveyed by the pressing means 34 between the pressing means 34 or its outer side 34a and the guiding device 78 in the direction of the pressed bale 12 or of the pressing chamber 26.

Here, the guiding device 78 and the guiding means 80 hold the wrapping material 60 under loading by the action of the spring means 90, 104 in contact with the pressing means 34 or its outer side 34a, with the result that it is securely and continuously conveyed in the direction of the pressing chamber 26 or of the pressed bale 12 and fed thereto between the roller 54 which is enwrapped by the press means 34 and the lower roller 28.

An accumulation of crop or other material may adhere on the pressing means 34 or its outer side 34a during particularly unfavorable wet, harvesting conditions, or if other material, impurities, stones, crop clods or the like enters between the guiding device 78 and the pressing means 34 or the outer side 34a of the pressing means 34 or the wrapping material 60 or between the wrapping material and the pressing means 34 or the outer side 34a of the pressing means 80. In these conditions, the one or more corresponding guiding means 80 may be displaced substantially in the vertical direction or approximately perpendicularly to the pressing means 34 in the respective bearing means 84, 86 and against the action of the spring means 90, 104. As a result, the material does not impede a conveying of the wrapping material 60 or a back-up of wrapping material 60 can be prevented. The remaining pressing means 80 hold the wrapping material 60 further in contact with the pressing means 34 or the outer side 34a of the pressing means 34, with the result that the latter can convey or transport the wrapping material 60 further at least substantially continuously in the direction of the pressed bale 12 or of the pressing chamber 26.

A bearing means 84, 86 is arranged both in a first end region 97 of the guiding means 80 that faces the wrapping device 58, or rear end region, and in a central region 103. The guiding means 80 can be moved or displaced in both bearing means 84, 86, or only in one of the bearing means 84, 86 in dependence on the amount or the thickness of the adherence or of the material during harsh conditions. As a result, the guiding means is lifted, where appropriate, only in certain regions from the pressing means 34 or the outer side 34a of the pressing means 34 and in its remaining extent under loading by the one or both spring means 90, 104 and holds the wrapping material 60 in contact with the pressing means 34 or its outer side, and guides it, or supports the pressing means 34 in the conveying of the wrapping material 60.

Apart from the advantages in operation, the guiding device 78 shown offers the possibility of simple mounting and demounting. In particular, there is no need to demount the entire guiding device 78, for example, for exchange purposes, or to gain access to the pressing means 34 or the outer side 34a of the pressing means 34 in order to remove contamination or blockages or accumulations of wrapping material 60. Rather, individual guiding means 80 or individual bearing means 84, 86 can be demounted/mounted or replaced.

The mounting of a guiding means 80 is simplified by the fact that the rear region 88 can be inserted past the cross member 140 into the guide slot 96 of the guide element 92 of one of the rear bearing means 86 and can be held there without additional securing being required for this purpose. This also facilitates the mounting of the spring means 90.

One of the bearing means 84 arranged in the central region 103 can first be mounted on the guide means 80 in that the corresponding rail means 110 or the holding element 128 is inserted into the slot 154 of the clearance 152 and introduced further into the extension 156. The further rail means 110, the spring means 104 and the stop pieces 136a-c are connected to the rail means 110 via the screw connection 132. Both the rail means 108 and the rail means 110 are inserted between the prongs 144 of the receiving means 142 and held there by the action of the spring means 104, the stop means 136a-c and the stop 122.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A guiding device for an agricultural baler having a frame defining a longitudinal axis extending parallel to a direction of travel of the agricultural baler, a pressing means operable to form a pressed bale in a pressing chamber, and a wrapping device operable to supply a wrapping material, the guiding device comprising:
   a guiding means configured to extend along the pressing means for leading the wrapping material to the pressing means;
   wherein, the guiding means includes:
      a front bearing means configured for attaching the guiding means to the frame and including a spring means biasing the guiding means toward the pressing means;
      a rear bearing means configured for attaching the guiding means to the frame and including a spring means biasing the guiding means toward the pressing means:
      wherein the front bearing means and the rear bearing means are spaced apart from each other along the longitudinal axis of the frame.

2. The guiding device of claim 1, wherein the spring means of the front bearing means is a compression spring, and wherein the spring means of the rear bearing means is a tension spring.

3. The guiding device of claim 1, wherein the guiding means includes a plurality of guiding means configured to be moveable relative to the frame independently of one another, with each of the plurality of guiding means including a respective front bearing means and a respective rear bearing means.

4. The guiding device of claim 1, wherein the front bearing means and the rear bearing means are configured to guide the guiding means in a direction perpendicular to the pressing means.

5. An agricultural baler comprising:
   a frame defining a longitudinal axis extending parallel to a direction of travel;
   a pressing belt operable to form a pressed bale in a pressing chamber;
   a wrapping device operable to supply a wrapping material to wrap the pressed bale;
   a guide disposed adjacent to and extending along the pressing belt, wherein the guide is operable to lead the wrapping material in the direction of travel from the wrapping device to the pressing chamber, wherein the guide includes:
      a front mount attaching the guide to the frame and including a spring biasing the guide toward the pressing belt;
      a rear mount attaching the guide to the frame and including a spring biasing the guide toward the pressing belt;
      wherein the front mount and the rear mount are spaced apart from each other along the longitudinal axis of the frame.

6. The agricultural baler set forth in claim 5, wherein the spring of the front mount is a tension spring.

7. The agricultural baler set forth in claim 6, wherein the spring of the rear mount is a compression spring.

8. The agricultural baler set forth in claim 5, wherein the guide includes a plurality of guides, with each respective one of the plurality of guides having a respective front mount and a respective rear mount, and with each respective one of the plurality of guides mounted and moveable relative to the frame independently of the other of the plurality of guides.

9. The agricultural baler set forth in claim 5, wherein the guide extends substantially parallel to the longitudinal axis of the frame.

10. The agricultural baler set forth in claim 5, wherein the front mount and the rear mount each bias the guide in a direction perpendicular to the pressing belt.

11. The agricultural baler set forth in claim 5, wherein the guide is positioned substantially below the pressing chamber.

12. The agricultural baler set forth in claim 5, wherein the guide is positioned to lead the wrapping material to an outer side of the pressing belt that faces away from the pressing chamber.

13. The agricultural baler set forth in claim 5, wherein the pressing belt includes an endless pressing belt.

14. The agricultural baler set forth in claim 5, wherein the pressing belt revolves at least approximately parallel to the longitudinal axis in the direction of travel.

* * * * *